United States Patent [19]

Danby et al.

[11] Patent Number: 4,555,950

[45] Date of Patent: Dec. 3, 1985

[54] REFRACTIVE OPTICAL FLUID PRESSURE SENSOR

[75] Inventors: Hal C. Danby, Palo Alto; Carl Ritson, San Jose, both of Calif.

[73] Assignee: Anatros Corporation, San Jose, Calif.

[21] Appl. No.: 625,161

[22] Filed: Jun. 27, 1984

[51] Int. Cl.[4] ............................................. G01L 7/00
[52] U.S. Cl. .................................... 73/705; 250/231 P
[58] Field of Search ................. 73/705, 747, 749, 293; 250/231 P, 231 R

[56] References Cited

U.S. PATENT DOCUMENTS 1,811,946  6/1931  Le Bailly .............................. 73/293

Primary Examiner—Donald O. Woodiel
Attorney, Agent, or Firm—William B. Walker

[57] ABSTRACT

The refractive optical pressure sensor of this invention is a system for measuring the pressure of a liquid comprising a light source, a light detector and a capillary formed in a transparent solid. A refractive surface of the capillary is positioned in the light path of light from the light source. A light detector is positioned in the path of light originating from the light source which has been refracted by the refractive surface of the capillary filled with air but outside of the path of light which has been refracted by the refractive surface of the capillary filled with liquid. The inlet end of the capillary is open for communication with liquid to be monitored for pressure, and the other end of the capillary is closed or communicates with a closed reservoir. Small changes in liquid pressure change the amount of liquid in the capillary passageways, causing an easily detected change in sharply refracted light.

9 Claims, 6 Drawing Figures

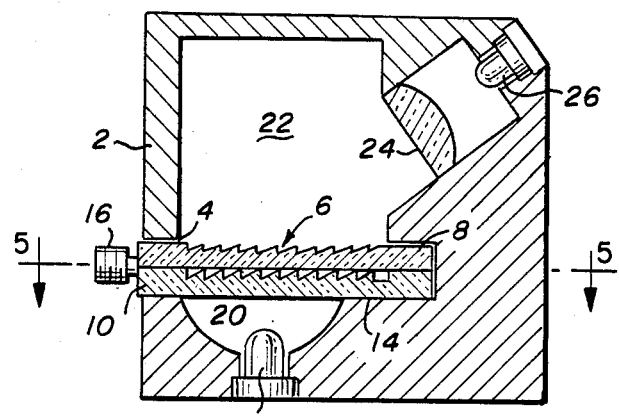
Fig_1
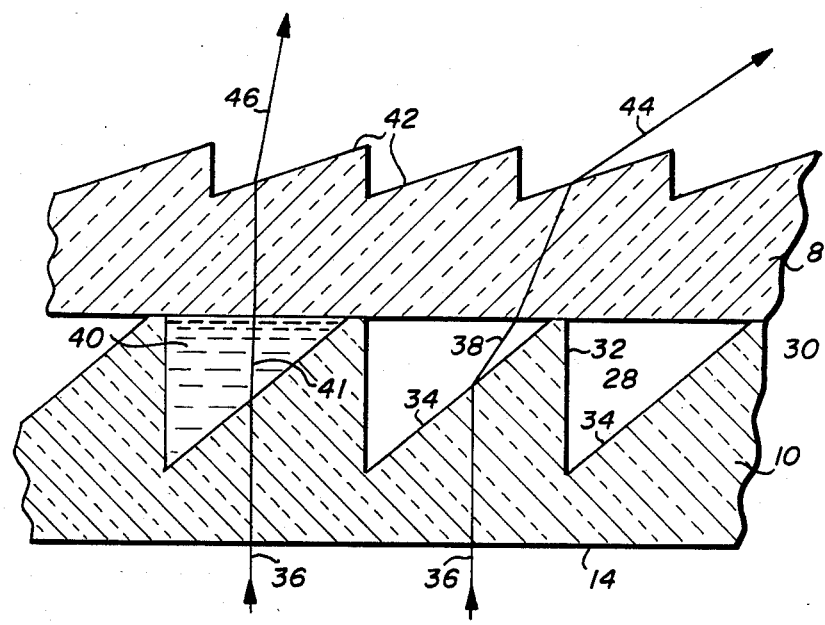
Fig_2
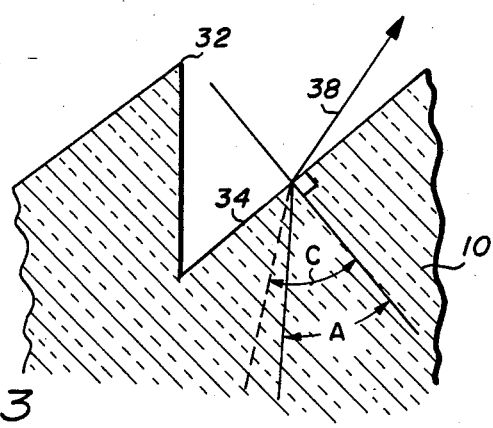
Fig_3

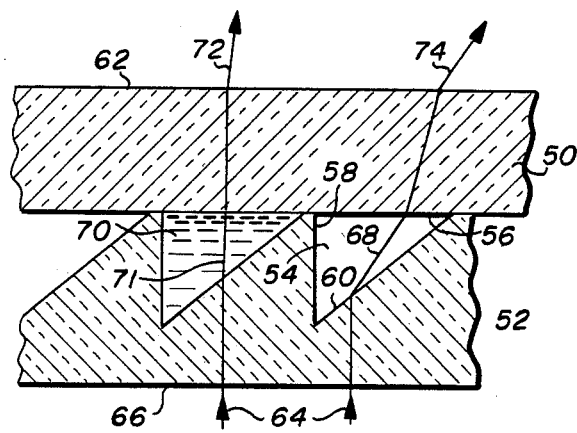
Fig_4
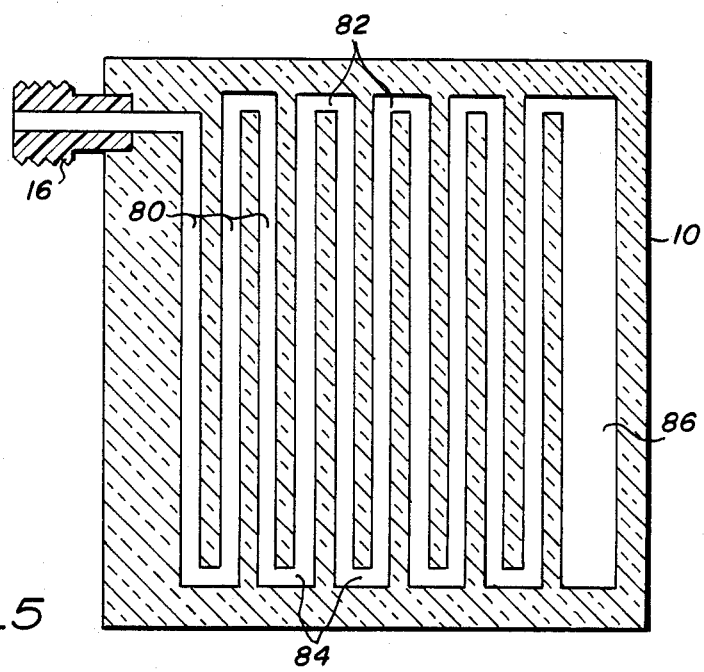
Fig_5
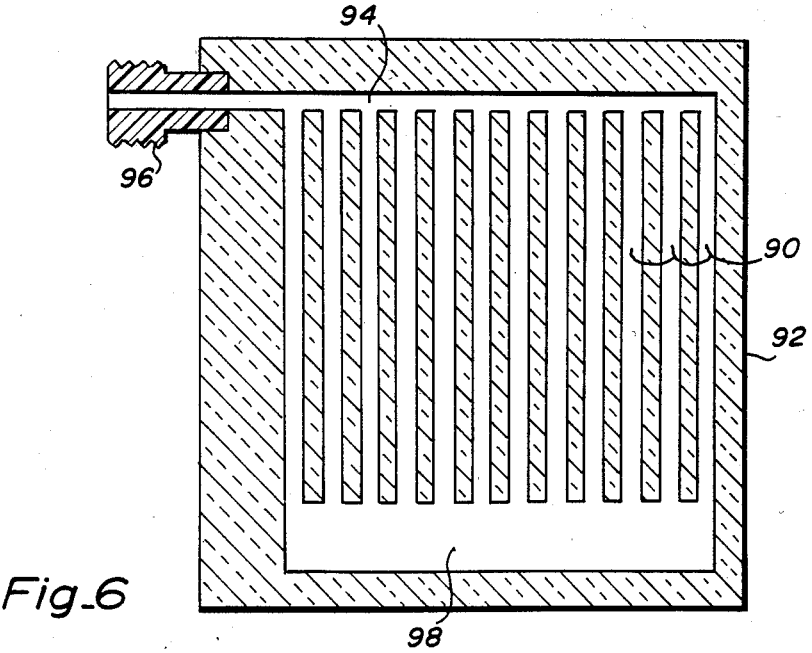
Fig_6

REFRACTIVE OPTICAL FLUID PRESSURE SENSOR

FIELD OF THE INVENTION

This invention relates to the measurement of fluid pressures. In particular, this invention relates to an apparatus for continuously measuring fluid pressure using a reflective optical sensing system.

BACKGROUND OF THE INVENTION

Parenteral solution delivery is usually accomplished using fluid pressure provided by hanging the solution source above the patient. This practice has continued despite the development of newer fluid reservoir systems such as plastic bags and the development of precision pumping systems. Obstructions of the delivery system within the body of the patient are common due to clotting, body movement, infiltration (extravasation), catheter position (proximity of vessel wall to cathater end), vein collapse and the like. This increases fluid pressure in the system between the pump and the patient until the pressure frees the blockage or the motor stops, unless the system has a safety system disengaging the pump motor from the pump or a safety valve releasing the pressure.

Sudden blow-out of the blockage poses a serious danger to the patient. To prevent this, it is necessary to sense any significant increase in fluid pressure between the pump and patient and to immediately stop the pumping action. The devices heretofore available do not have the required sensitivity, and the risk of patient injury from parenteral pump delivery systems continues.

DESCRIPTION OF THE PRIOR ART

Prior to this invention, limited methods have been available to measure fluid pressures. Manometer systems (U.S. Pat. No. 2,817,237) have been used in measuring pressure differentials across flow restrictors to determine fluid flow rates. Bellows with radiation sources (U.S. Pat. No. 3,977,391) have been used. An optical device for measuring pressure differences by means of a light intensity change is described in U.S. Pat. No. 4,322,978. In this system, pressure changes deflect a reflective surface, causing displacement of the light path of reflected light and consequential change in light intensity on a light detector. The device is not suitable for use with parenteral systems.

U.S. Pat. No. 4,398,542 discloses a fluid pressure monitoring system with a pressure diaphram operating on a pressure transducer. Increasing fluid pressure causes movement of the diaphram and increases pressure on the pressure transducer. Piston systems responding to increased fluid pressure to apply increased pressure on pressure transducers are also known. These systems lack the precision and sensitivity required for patient safety.

SUMMARY OF THE INVENTION

The refractive optical pressure sensor of this invention is a system for measuring the pressure of a liquid comprising a light source, a light detector and a capillary. The capillary is a passageway formed in a transparent solid. A refractive surface of the capillary is positioned in the light path of light from the light source. A light detector is positioned in the path of light originating from the light source which has been refracted by the refractive surface of the capillary filled with air but outside of the path of light which has been refracted by the refractive surface of the capillary filled with liquid. The inlet end of the capillary is open for communication with liquid to be monitored for pressure, and the other end of the capillary is closed or communicates with a closed reservoir. If the pressure of the liquid to be monitored increases, increasing amounts of the liquid pass into the capillary passageway and into the capillary area in the path of light from the light source. The transparent solid to liquid interface has a much lower angle of refraction than the solid to air interface, providing refracted light paths which can be easily discriminated. The proportion of the capillary area occupied by the liquid does not refract light into the light path aligned with the light detector and hence causes a corresponding decrease in electric signal from the light detector. If the liquid entering the capillary passageway is transparent, the light refraction path is changed and far less light reaches the light detector. If the liquid is not transparent, the light is absorbed, and the amount of refracted light reaching the light detector is reduced to zero. Only very slight increases in liquid pressure cause substantial changes in solid/air refractive surface area, providing significant, quantitative changes in light detector output. These can be easily correlated with actual pressure values or used to effect control and safety functions of parenteral delivery pump systems.

BRIEF DESCRIPTION OF THE DRAWINGS

FIG. 1 is a cross-sectional view of the refractive optical fluid pressure sensor of this invention.

FIG. 2 is an greatly enlarged, partial cross-sectional view of the capillary and refractive surfaces shown in FIG. 1.

FIG. 3 is a schematic view of a refractive surface showing critical angles.

FIG. 4 is an enlarged, partial cross-sectional view of a capillary and refractive surface corresponding to the single refracting embodiment of this invention.

FIG. 5 is a cross-sectional view of the pressure sensor device of this invention taken along the line 5—5 in FIG. 1 showing a serially connected capillary configuration.

FIG. 6 is a cross-sectional view of the pressure sensor device of this invention showing a parallel connected capillary configuration.

DETAILED DESCRIPTION OF THIS INVENTION

FIG. 1 is a cross-sectional view of the refractive optical fluid pressure sensor of this invention with two refracting surfaces. The device has a housing 2 preferably made of an opaque material such as opaque organic polymer or metal having a recess receptor 4 for receiving the refractive optical element 6. The optical element 6 has an upper plate 8 and a lower plate 10 made of a transparent plastic or glass having refractive indices required to provide refraction of transmitted light to a selected refraction angle. The optical element 6 is supported in the receptor 4 on its lower surface 14. The connector 16 connects the capillary elements to a liquid to be monitored for pressure as is explained in greater detail hereinafter with respect to FIGS. 5 and 6.

The housing 2 supports a light source 18 projecting into a light diffusion cavity 20 to which the lower surface 14 of the optical element 6 is exposed. Preferably the surfaces of the diffusion cavity 20 are highly reflective or mirrored. The housing 2 also has a transmitted light cavity 22 and a collector lens 24 aligned with a light detector 26. The collector lens 24 is positioned in the path of light which has passed through the optical element 6 and has been greatly refracted by refractive surfaces which are not in contact with liquid as is explained in greater detail with respect to FIGS. 2–6. The axis of the collector lens 24 is aligned with the light path of the highly refracted light. Light which has been passed through refractive surfaces which are in contact with light transmitting liquid is not greatly refracted and does not fall on the collector lens 24. The light emitting source 18 can be any conventional lamp or light emitting diode. Because the system can be entirely closed to light, the light frequency emitted by the lamp is not critical. Light which is minimally absorbed by the transparent solid material of plates 8 and 10 and which is maximally absorbed by the liquid to be monitored is preferred. Infra-red light is particularly suitable for most transparent solids and most liquids. The light detector 26 can be any conventional light detector which is sensitive to the frequency spectrum of light emitted by the emitter 18, such as a light detecting diode.

FIG. 2 is an greatly enlarged, partial cross-sectional view of the capillary area and refractive surfaces of the optical element 6 shown in FIG. 1. The upper plate 8 and lower plate 10 are in sealing engagement, or they can be integrally joined. Capillary passageways 28 in the lower plate 10 are defined by the lower surface 30 of the upper plate 8, the non-refracting surface 32 and a first refracting surface 34. Light 36 from source 18 (FIG. 1) impinges on the surface 14 in paths normal to the surface 14 and passes through the lower plate 10. It is sharply refracted to light path 38 when the capillary passageway 28 through which it passes is not filled with liquid. When the passageway is filled with a light transmitting liquid 40, it is only slightly bent to path 41.

The light impinges on the surface 30 and passes through the upper plate 8 where it is again refracted. The light in path 38 is at a greater angle from the second refractive surfaces 42 then the slightly refracted light in path 41. The angle between the final path 44 of the strongly, doubly refracted light and the path 46 of the less strongly refracted light is widened, and the light in the two paths can be easily distinguished by appropriately positioning of light detector assemblies 24 and 26 (FIG. 1). If the capillary passageway is filled with an opaque or light absorbing liquid, the light passing through the liquid filled capillary passageways is completely absorbed and consequently does not reach the detector 26.

FIG. 3 is a schematic view of a refractive surface showing critical angles required in forming the first refractive surface 34 in FIG. 2. The angle A between the normal of the refractive surface 34 and the light path 36 must be less than the Critical Angle C of the transparent material of which the plate 10 is made. The Critical Angle C in air can be determined from the equation Sin C=l/n wherein n is the index of refraction of the transparent solid. Refractive indexes of most transparent solids are well known. Readily available transparent organic polymers can be selected to form the plate 10 to obtain desired refractive indexes within the range of 1.34 (TEFLON) corresponding to a Critical Angle of 48.3 degrees to 1.64 (polyester) corresponding to a Critical Angle of 37.6 degrees. The acrylic polymers are particularly suitable because of their superior optical qualities and can be selected to provide a refractive index within the range of from 1.49 (C=42.2 degrees) to 1.56 (C=39.9 degrees).

FIG. 4 is an enlarged, partial cross-sectional view of a capillary with a refractive surface corresponding to the single refracting embodiment of this invention. The upper plate 50 and lower plate 52 are in sealing engagement or are integrally joined. The capillary passageway 54 is defined by the lower surface 56 of the upper plate 50, the non-refracting surface 58 and the refractive surface 60. This embodiment differs from the embodiment shown in FIG. 2 in the omission of a second special refracting surface in the upper plate 50, the upper surface 62 being planar.

Light 64 in paths impinging on the lower surface 66 of lower plate 52 which is normal to the lower surface 66 passes through the lower plate 52 and is sharply refracted to light path 68 when the capillary passageway 54 through which it passes is not filled with liquid. When the passageway is filled with a light transmitting liquid 70, it is only slightly bent to path 71. The angle between the final light paths 72 and 74 are sufficiently great to be distinguished by suitably positioned light detector assemblies as described in FIG. 1.

FIG. 5 is a cross-sectional view of the pressure sensor device of this invention taken along the line 5—5 in FIG. 1 and showing a serially connected capillary configuration. In this view the lower pressure sensor capillary plate 10 has a plurality of linear passageways 80, the ends thereof being serially connected in a zig-zag configuration by serial connecting passageways 82 and 84. The inlet end of the passageway system communicates with the inlet opening connector 16. The other end of the passageway system communicates with the closed gas reservoir 86. In operation with the connector 16 communicating with a liquid to be monitored for pressure increase, liquid passes into the capillary passageway 80 until the pressure of the gas in the remainder of the capillary system and the reservoir 86 rises sufficiently to balance the liquid pressure and stop the liquid advance. If the liquid pressure again increases, liquid again advances into further portions of the capillary system until the gas pressure in the remainder of the system rises to balance the liquid pressure. If the liquid pressure decreases, the gas displaces the liquid from the passageway until the gas and liquid pressures are balanced. As described above with respect to FIG. 2, the portions of the capillary passageways occupied by liquid refract light at an angle which is substantally less than the the refractive angle in the capillary passageways filled with air or another gas. This combined with the second refraction directs light passing through the gas filled capillaries to the light collecting lens and light detector positioned in the path thereof. Light which has passed through liquid filled capillaries is not diffracted to the path in which the light collecting lens is placed, and the amount of light reaching the light detector 26 (FIG. 1) is correspondingly reduced.

The capillary passageways in this system should be sufficiently small to prevent liquid from bypassing gas in the passageway, entrapping bubbles of gas in the liquid phase. The term "capillary" as used herein is defined to include all dimensions of passageways which meet the above specifications and is not limited to dimensions which provide capillary action. The preferred cross-sectional areas are less than 5 mm² and are preferably within the range of from 0.1 to 1.0 mm² for most solutions.

FIG. 6 is a cross-sectional view of the pressure sensor of this invention showing a parallel connected capillary configuration. In this system, the capillary passageways 90 are formed in a lower plate 92 which corresponds in function and materials to the lower plate 10 described hereinabove. The capillary passageways 90 are arranged in parallel configuration, the inlet openings of each communicating with an inlet manifold or channel 94 which communicates with the inlet connector 96. The outlet openings of the passageways 90 communicate with the closed gas reservoir 98. Liquid which has passed into the capillary area reduces the amount of light refracted by the reflective surfaces of the capillary passageways 90 as described above with respect to FIG. 2. Liquid enters the passageways 94 and 90 until the gas pressure in the remainder of the passageways and reservoir 98 balances the liquid pressure in the same manner described above with respect to FIG. 5.

The length of the capillary passageways and respective volume ratios of the passageways and the gas reservoir determine the sensitivity of the system. The capillary configuration in FIG. 5 provides greater sensitivity than the configuration in FIG. 6. Higher reservoir to capillary volume ratios also increase sensitivity, requiring the entrance of proportionally more liquid into the passageways before a liquid pressure increase is balanced.

Capillary passageways having a linear, parallel configuration shown in the illustrated embodiments of this invention are merely representative of the shapes of the passageways, and this invention is not limited thereto. The capillary passageways can be a continuous spiral, for example, or be concentric circular paths, connected either in series or in parallel, as desired, with the reservoir in the center or, alternatively, for example, in the outer perimeter.

This invention has been described in embodiments wherein the light most bent by refraction is detected and light which passes through the liquid filled capillaries, if any, passes out of the system without being measured. It will be readily apparent that the light which has passed through the system without being greatly bent can be detected, instead, if the liquid being monitored for pressure is transparent.

The invention claimed is:

1. An optical fluid pressure sensor comprising a light source, a capillary passageway containing a gas and formed in a transparent solid, the capillary passageway having a refractive surface positioned in the light path of light from the light source, the angle between the normal to the refractive surface and the light path being less than the Critical Angle of the transparent solid, and a light detector positioned in the path of refracted light when the refractive surface is a solid-to-gas interface and outside the path of refracted light when the refractive surface is a solid-to-liquid interface, the capillary passageway having an inlet end means for receiving liquid from an external source under fluid pressure to be monitored and an outlet end, the outlet end thereof having a closure means for preventing escape of gas therefrom.

2. The optical pressure sensor of claim 1 wherein the light source is a light emitting diode and the light detector is a light detecting diode.

3. The optical pressure sensor of claim 1 wherein capillary passageways are formed in the surface of a first transparent plate against which a second transparent plate is positioned in sealing engagement.

4. The optical pressure sensor of claim 1 wherein the capillary passageway means comprises a plurality of capillary passageways connected in a zig-zag configuration to form a capillary passageway zone.

5. The optical pressure sensor of claim 4 wherein the capillary passageways are linear and parallel, the ends thereof being serially connected.

6. The optical pressure sensor of claim 5 wherein the capillary passageways are formed in the surface of a first transparent plate against which a second transparent plate is positioned in sealing engagement.

7. The optical pressure sensor of claim 4 wherein the capillary passageways are linear and parallel, the inlet ends thereof communicating with and connected by an inlet means and the outlet ends thereof being connected to a closed gas reservoir.

8. The optical pressure sensor of claim 7 wherein the capillary passageways are formed in the surface of a first transparent plate against which a second transparent plate is positioned in sealing engagement.

9. The optical pressure sensor of claim 1 wherein capillary passageways and a first refractive surface are formed in a lower plate of transparent solid to which an upper plate of transparent solid is sealingly engaged, and the upper surface of the upper plate has a second refracting surface, the light detector being positioned in the path of light which has been refracted by said first refractive surface when the capillary passageway does not contain liquid and then refracted by said second refractive surface.

* * * * *